(12) United States Patent
Haro

(10) Patent No.: US 6,980,391 B1
(45) Date of Patent: Dec. 27, 2005

(54) DISK DRIVE WITH COIL SPRING ATTACHING FLEX BRACKET TO BASE

(75) Inventor: Jorge Haro, Stockton, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/261,436

(22) Filed: Sep. 30, 2002

(51) Int. Cl.[7] ............... G11B 33/12; G11B 25/04; G11B 5/55
(52) U.S. Cl. .............. 360/97.01; 360/264.2
(58) Field of Search .......... 360/97.01, 97.02, 360/97.03, 264.2, 266.3

(56) References Cited

U.S. PATENT DOCUMENTS

| | | | | |
|---|---|---|---|---|
| 5,223,996 A | * | 6/1993 | Read et al. | 360/97.02 |
| 5,557,486 A | * | 9/1996 | Akagi et al. | 360/97.01 |
| 6,081,407 A | | 6/2000 | Khuu | |
| 6,141,222 A | | 10/2000 | Toor et al. | |
| 6,721,135 B2 | * | 4/2004 | Hong et al. | 360/264.2 |
| 6,754,041 B2 | * | 6/2004 | Hong et al. | 360/97.02 |

* cited by examiner

*Primary Examiner*—Craig A. Renner
(74) *Attorney, Agent, or Firm*—Joshua C. Harrison, Esq.

(57) ABSTRACT

A disk drive includes a base, a cover, a spindle motor attached to the base, a disk supported by the spindle motor, a subassembly for attachment to the base, and a compressible element positioned between the cover and the subassembly. The compressible element is in compression for attaching the subassembly to the base.

1 Claim, 5 Drawing Sheets

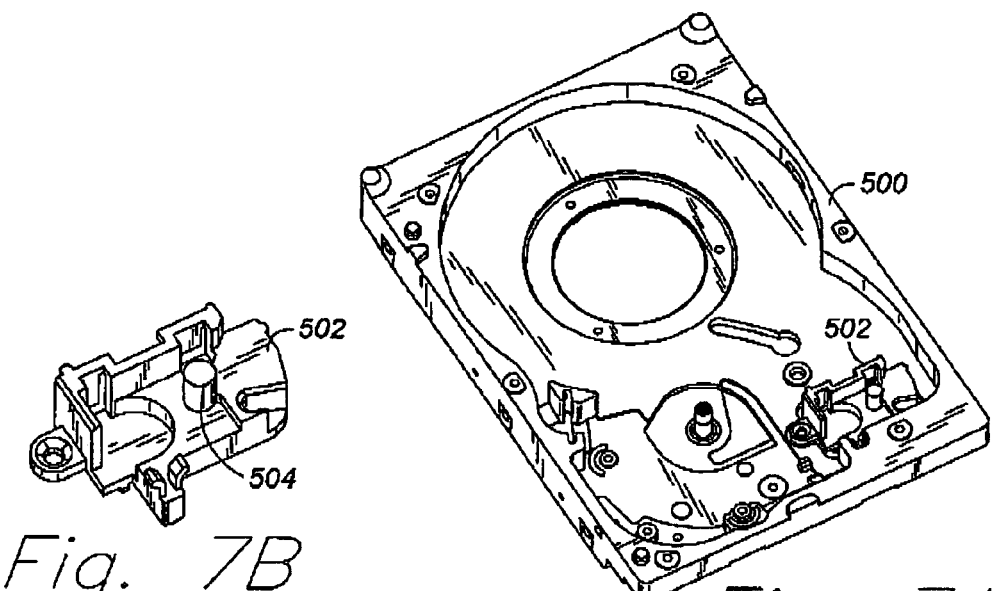
Fig. 7B
Fig. 7A
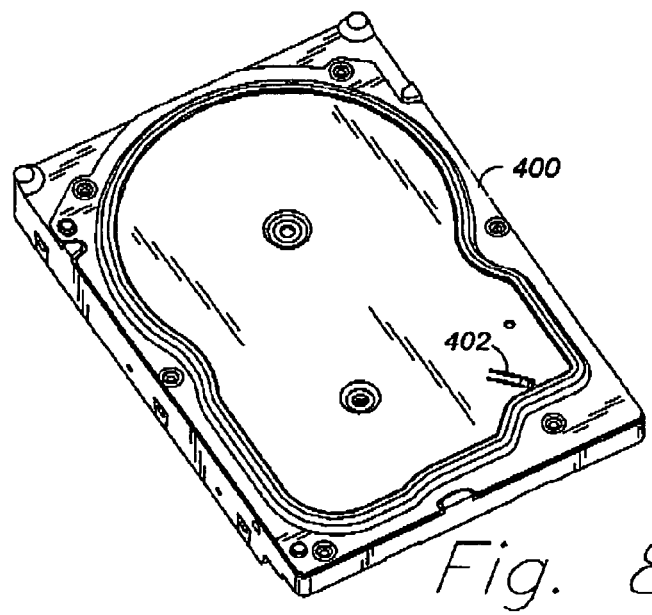
Fig. 8

DISK DRIVE WITH COIL SPRING ATTACHING FLEX BRACKET TO BASE

BACKGROUND OF THE INVENTION

1. Field of the Invention

This invention relates to disk drives. More particularly, this invention relates to a disk drive having a compressible element or a spring for attaching a subassembly to a base of the drive.

2. Description of the Prior Art and Related Information

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 20 gigabytes per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of attachment of certain subassemblies to a disk drive base ("base"). Typically, the main assemblies of a hard disk drive are a head disk assembly and a printed circuit board assembly.

The head disk assembly includes an enclosure including a base and a cover, at least one disk having at least one recording surface, a spindle motor for causing each disk to rotate, and an actuator arrangement which may be either rotary or linear. In a typical rotary actuator arrangement, a head stack assembly is used to read or write data from or to the disk. The head stack assembly includes a flex circuit assembly including a flex circuit cable and a flex bracket for attaching a distal end of the flex circuit cable to the base. The printed circuit board assembly includes circuitry for processing signals and controlling operations.

In head disk assemblies, threaded screws are typically used for most fastening applications such as fastening a flex bracket and a latch, such as a magnetic latch, to the base. However, such screws use valuable manufacturing time during assembly of the head disk assemblies and have the potential to increase contamination within the interior of the head disk assemblies by generating particulates.

SUMMARY OF THE INVENTION

This invention can be regarded as a disk drive including a base, a cover, a spindle motor attached to the base, a disk supported by the spindle motor, a subassembly for attachment to the base, and a compressible element positioned between the cover and the subassembly, the compressible element being in compression for attaching the subassembly to the base. In a preferred embodiment, the compressible element is a coil spring.

This invention can also be regarded as a disk drive including a base, a cover, a spindle motor attached to the base, a disk supported by the spindle motor, a subassembly for attachment to the base, and a spring positioned between the cover and the subassembly, the spring applying a fastening force on the subassembly for attaching the subassembly to the base.

In a preferred embodiment, the subassembly is a flex bracket. In an alternative embodiment, the subassembly is a latch. In a yet alternative embodiment, the spring is a leaf spring.

BRIEF DESCRIPTION OF THE DRAWINGS

FIG. 7A is a perspective view of a disk drive base having a flex bracket.

FIG. 7B is a perspective view of the flex bracket of FIG. 7A.

FIG. 8 is a perspective view of a disk drive having the cover shown in FIG. 6A.

DESCRIPTION OF THE PREFERRED EMBODIMENTS

Figure 1:
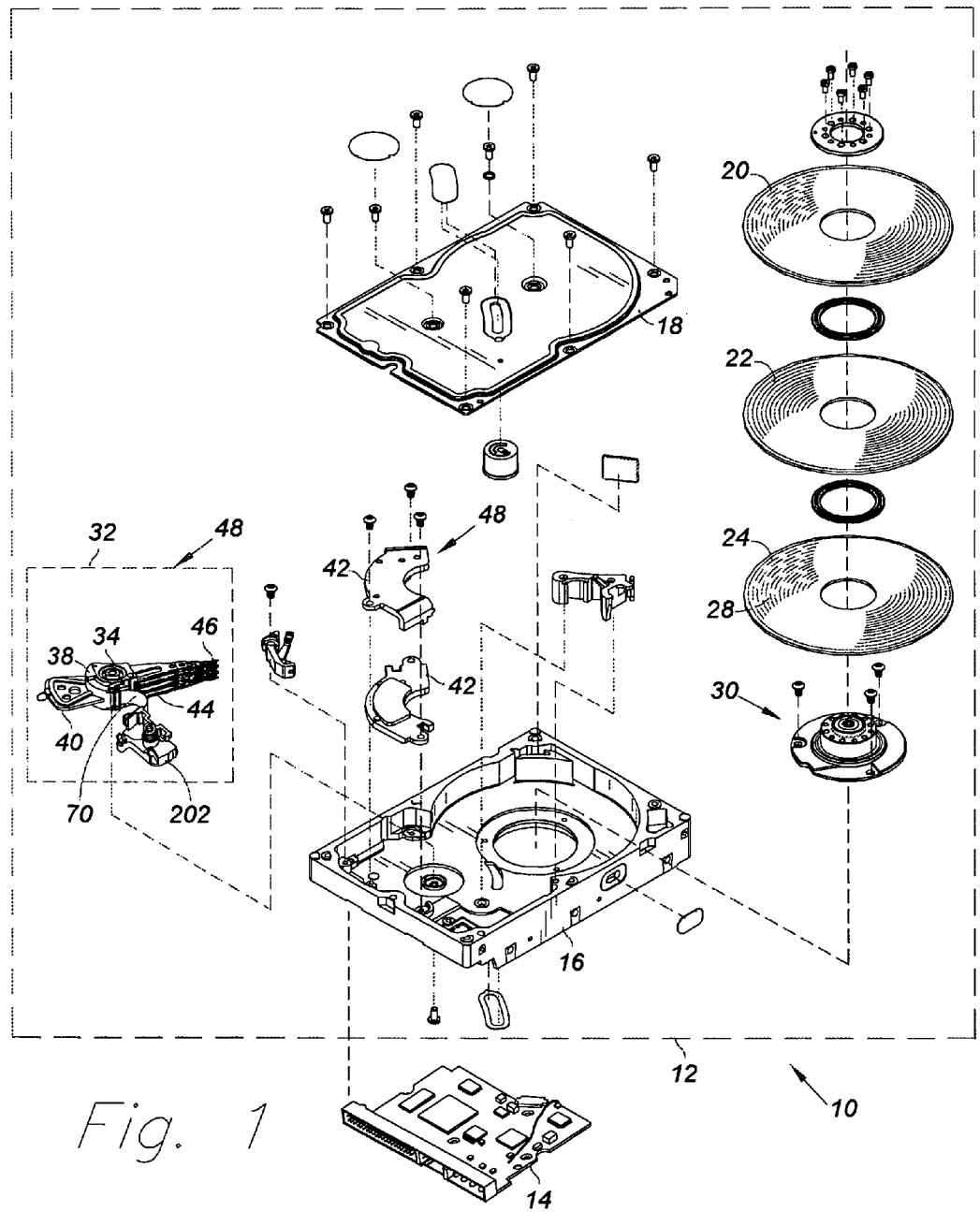
FIG. 1 is an exploded view of a disk drive incorporating an embodiment of this invention.

In FIG. 1, a disk drive 10 incorporating an embodiment of this invention includes an enclosure comprising a base 16 and a cover 18. The enclosure is sealed to provide a relatively contaminant-free interior for a head disk assembly (HDA) portion 12 of disk drive 10. Suitably, a gasket is used to seal the enclosure. Disk drive 10 also includes a printed circuit board assembly 14 which contains the circuitry for processing signals and controlling operations of disk drive 10.

Within its interior, disk drive 10 includes a magnetic disk 20 having a recording surface and includes a magnetic transducer 46. The particular embodiment shown in FIG. 1 includes three disks 20, 22, 24, providing six recording surfaces (e.g., recording surface 28), and includes six magnetic transducers 46. Disk drive 10 further includes a rotary actuator arrangement generally indicated at 48. A spindle motor 30 attached to base 16 causes each supported disk 20, 22, 24 to spin, preferably at a constant angular velocity.

Rotary actuator arrangement 48 provides for positioning magnetic transducer 46 over a selected area of recording surface 28 of disks 20, 22, 24. Rotary actuator arrangement 48 includes a permanent-magnet arrangement generally indicated by 42, and a head stack assembly 32 including a pivot bearing cartridge 34. Pivot bearing cartridge 34 includes a stationary shaft secured to the enclosure to define an axis of rotation for rotary actuator arrangement 48. Head stack assembly 32 further includes a plurality of actuator arms 44, an actuator body 38, a coil portion 40, and a flex circuit assembly 70.

As shown in FIG. 1, disk drive 10 includes a subassembly, such as a flex bracket 202, and a compressible element, such as a coil spring 206, positioned between cover 18 and the subassembly, the compressible element being in compression for attaching the subassembly to base 16. In a preferred embodiment, the subassembly is flex bracket 202 and the compressible element is coil spring 206 as shown in FIG. 1 and shown in more detail in FIGS. 2–3B.

Figure 2:
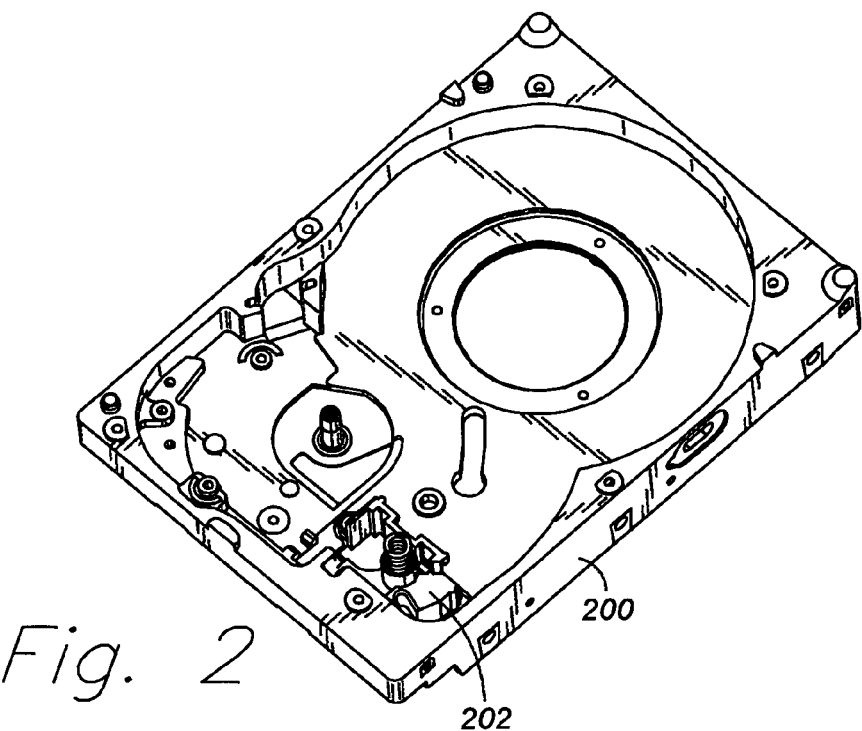
FIG. 2 is a perspective view of a disk drive base incorporating an embodiment of this invention.

In FIG. 2, flex bracket 202 is shown positioned on a base 200 over a flex connector aperture (not shown). When a cover, such as cover 18 shown in FIG. 1, is attached to base 200, the inner surface of the cover pushes against coil spring 206 such that coil spring 206 is in compression for attaching flex bracket 202 to base 200. Suitably, the compression force may be nominally 15 lbs minimum for attaching flex bracket 202 to base 200. In a preferred embodiment, the cover's inner surface may define a recess for receiving a top portion of coil spring 206 and the recess may have a layer of MYLAR for contamination control.

Figure 3A:
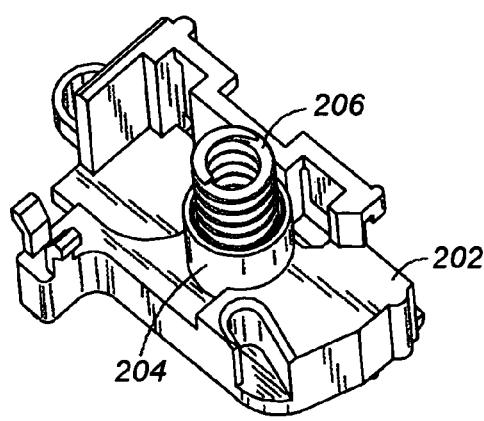
FIG. 3A is a perspective view of the flex bracket and coil spring shown in FIG. 2.
Figure 3B:
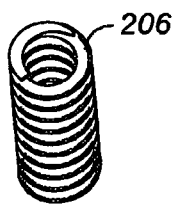
FIG. 3B is a perspective view of the coil spring of FIG. 3A.

In FIG. 3A, flex bracket 202 includes a cylindrical cavity 204 defining a bore for supporting coil spring 206 and as shown in FIG. 3B, coil spring 206 is preferably a separate component for attachment to flex bracket 202. Coil spring 206 may be formed from any suitable material that exhibits elastic material properties .

Figure 4:
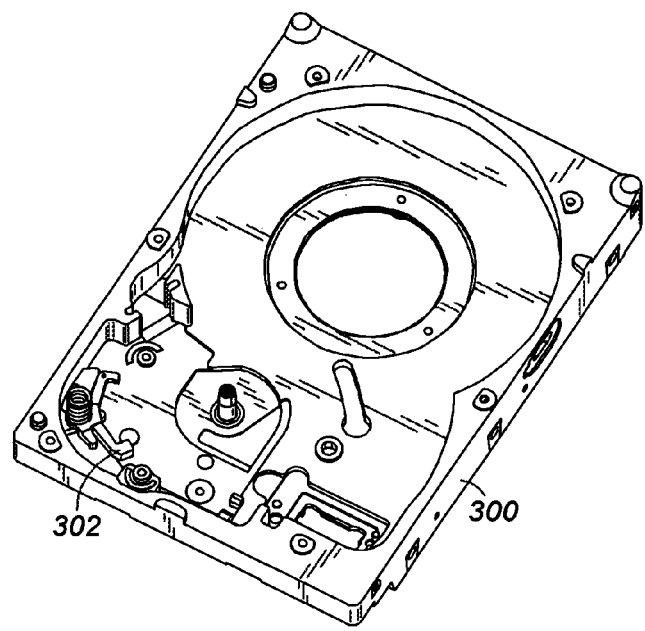
FIG. 4 is a perspective view of a disk drive base incorporating another embodiment of this invention.
Figure 5A:
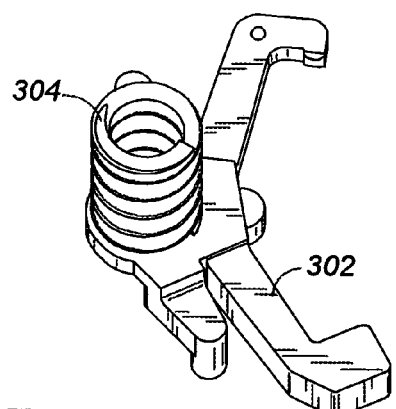
FIG. 5A is a perspective view of the latch and coil spring shown in FIG. 4.
Figure 5B:
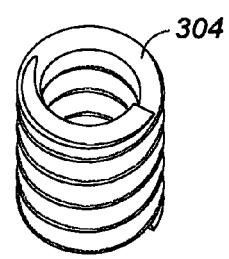
FIG. 5B is a perspective view of the coil spring of FIG. 5A.
Figure 6A:
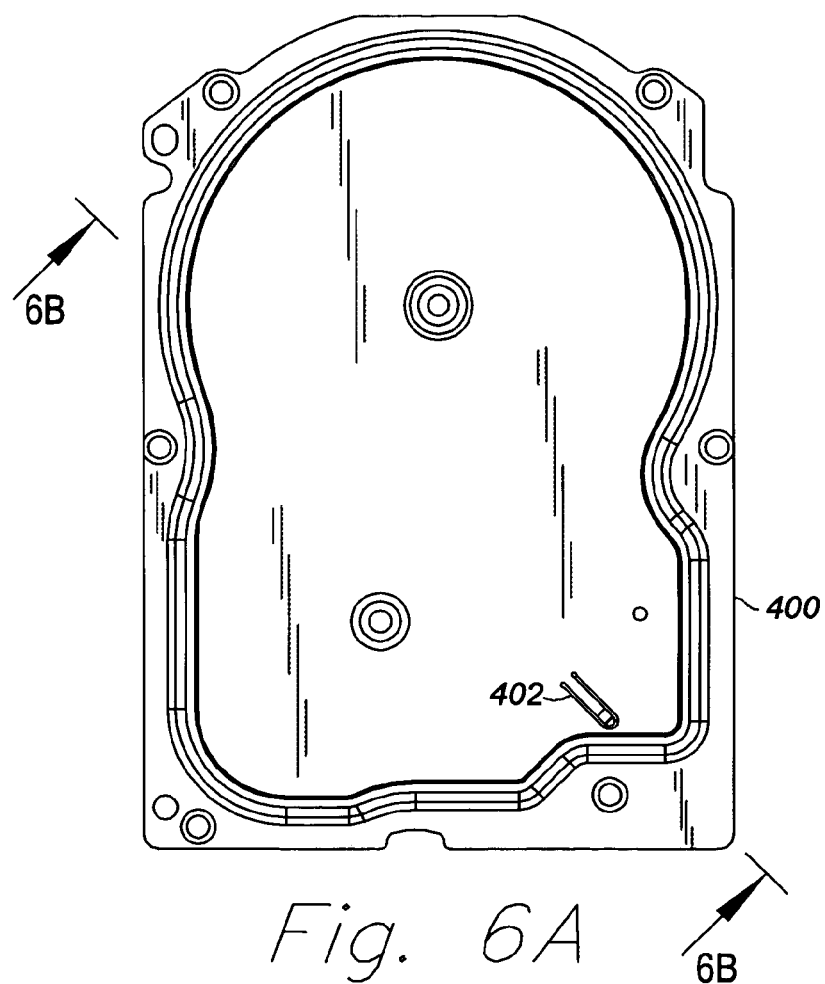
FIG. 6A is a plan view of a cover including a leaf spring in accordance with another embodiment of this invention.
Figure 6B:
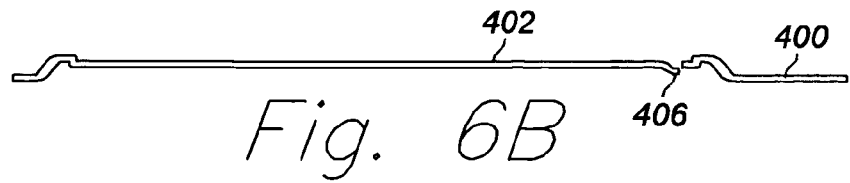
FIG. 6B is a cross section view of FIG. 6A in which a leaf spring is shown prior to its engagement with a subassembly.

In FIGS. 4–5B, another embodiment of this invention is shown in which a compressible element is used to attach a subassembly, such as a magnetic latch 302, to a base 300 of a disk drive. Similar to the discussion above with reference to FIGS. 2–3B, a coil spring 304 is in compression when a cover, such as cover 18 shown in FIG. 1, is attached to base 300 such that the inner surface of the cover pushes against coil spring 304 such that coil spring 304 is in compression for attaching magnetic latch 302 to base 300. While a magnetic latch is shown, other types of latches, such as an inertial latch, may be used to practice this invention. In an alternative embodiment, a compressible element such as a spring washer may be used.

In FIGS. 6A–8, another embodiment of this invention is shown in which a leaf spring 402 is used to attach a subassembly, such as a flex bracket 502, to a base 500 of a disk drive. Such a spring is positioned between a cover 400 and the subassembly, the spring applying a fastening force on the subassembly for attaching the subassembly to base 500. In the embodiment shown, leaf spring 402 includes a distal portion 406 which pushes against a post 504 when cover 400 is attached to base 500 such that a suitable fastening force is applied on flex bracket 502 for attaching flex bracket 502 to base 500. In a preferred embodiment, leaf spring 402 is integrally formed with cover 400 via a stamping process. In another embodiment, leaf spring 402 may be a separate component suitably attached to an inner surface of cover 400.

I claim:

1. A disk drive comprising:
   a base;
   a cover;
   a spindle motor attached to the base;
   a disk supported by the spindle motor;
   a subassembly for attachment to the base;
   a compressible element positioned between the cover and the subassembly, the compressible element being in compression for attaching the subassembly to the base, wherein the compressible element is a coil spring, the subassembly is a flex bracket, the flex bracket including a bore for supporting the coil spring.

* * * * *